United States Patent [19]

Ogura

[11] Patent Number: 5,061,050
[45] Date of Patent: Oct. 29, 1991

[54] POLARIZER

[75] Inventor: Toshiaki Ogura, Hirakata, Japan

[73] Assignee: Matsushita Electric Industrial Co., Ltd., Osaka, Japan

[21] Appl. No.: 597,723

[22] Filed: Oct. 16, 1990

[30] Foreign Application Priority Data

Oct. 18, 1989 [JP] Japan ................................ 1-270652

[51] Int. Cl.⁵ ............................ G02B 5/28; G02B 5/30
[52] U.S. Cl. ................................... 359/490; 359/589; 359/831
[58] Field of Search ............... 350/370, 397, 398, 164, 350/166, 167, 642, 286, 287, 162.22, 162.23

[56] References Cited

U.S. PATENT DOCUMENTS 2,769,111 10/1956 Sadowsky ........................... 350/166
3,338,730 8/1967 Slade et al. ........................ 350/166

FOREIGN PATENT DOCUMENTS 61-17103 1/1986 Japan .
61-262705 11/1986 Japan .

Primary Examiner—Bruce Y. Arnold
Assistant Examiner—Martin Lerner
Attorney, Agent, or Firm—Wenderoth, Lind & Ponack

[57] ABSTRACT

An improved polarizer employing thin films is provided having higher optical properties and capable of fabricating in the mass production and reducing in the overall size or thickness. Particularly, a layer of optical element for polarizing separation of light extends over an undulated surface of a substrate having a cross section of either trapezoid-waveform or triangle-waveform oriented in a particular direction. The substrate having a trapezoid-waveform surface incorporates layers of optical element for reflection or absorption of light which are provided on the upper- and lower-base regions, excluding the sloping regions, of the trapezoid-waveform surface. On the other hand, the substrate having a triangle-waveform surface incorporates layers of optical element for absorption of light which are provided on the upper and lower peak regions of the triangle-waveform surface.

16 Claims, 3 Drawing Sheets

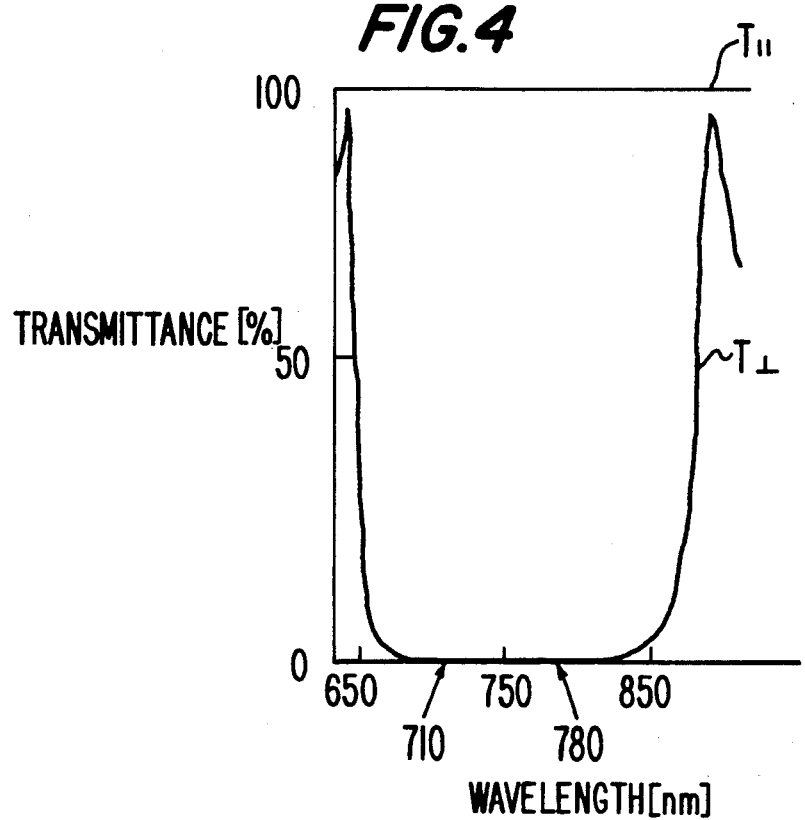
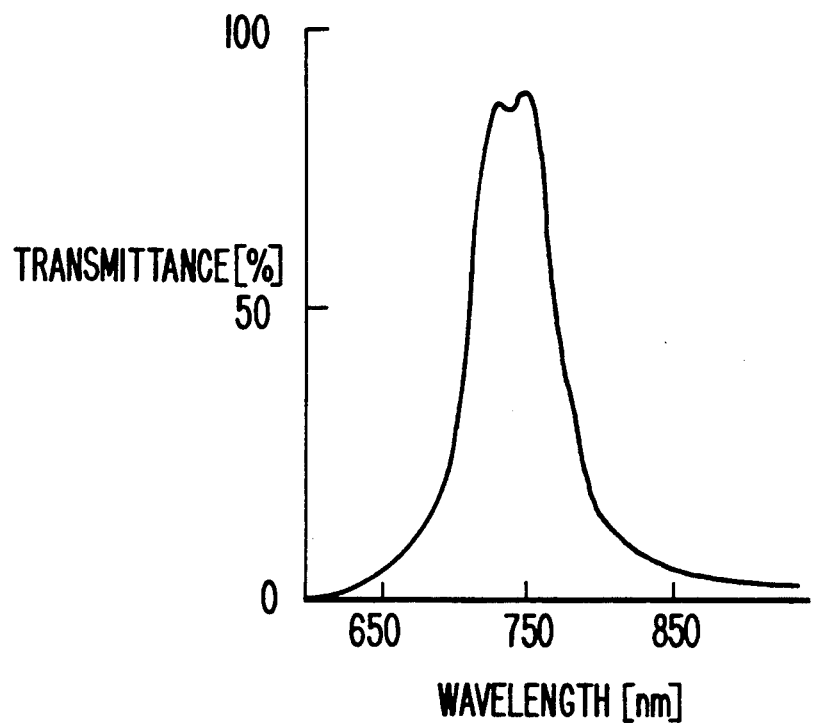

POLARIZER

BACKGROUND OF THE INVENTION

1. Field of the Invention

The present invention relates to a polarizer for obtaining linearly polarized light from natural light, and more particularly to a polarizer for use in an optical system such as a liquid crystal projection television, an optical communications system, or the like.

2. Description of the Prior Art

There have been known three different types of polarizers; (1) one using a double refracting crystal material, (2) one using a medium material having a linearly dichroic property, and (3) one using surface reflection on a thin film of dielectric material.

The double refracting crystal polarizers include the Nicol prism and the Glan-Thompson prism, each of which consists of two prism elements of calcite bonded together with an optical adhesive so that the ordinary ray of incident light entering the prism is totally reflected at the junction and the extraordinary ray passes through the prism as a linearly polarized light.

The linearly dichroic polarizer is composed of films of linearly dichroic material, e.g. iodine-PVA, bonded with a protective layer of e.g. acryl or triacetylcellulose. In this polarizer, one of two linearly polarized components of incoming light running straight is absorbed by the linearly dichroic material, whereby the other linearly polarized component will be obtained after passing through the dichroic material film of an adequate thickness.

The dielectric thin film polarizer is provided with a dielectric thin film interposed between two prisms for polarizing separation of light. Light entering the polarizer is separated by the dielectric thin film into two linearly polarized components; one passing through and the other being reflected. Hence, both the passing and reflected light components are delivered as linearly polarized light outputs.

However, the double refracting crystal polarizer when increased in size requires large-size crystal material, thus causing the size and production cost of a relating optical device. The linearly dichroic polarizer which absorbs a particular component of incident light permits no reflected light to be delivered for use and is disadvantageous in the resistance to heat and climate. Also, the polarizer having a dielectric thin film interposed between two prisms often has to be enlarged in the overall size in order to pass a desired amount of polarized light.

Some improved ones of the dielectric thin film polarizers which are reduced in the size or thickness are disclosed in Japanese Patent Laid-open Publications No. 61-17103(1986) and No. 61-262705(1986).

The polarizer disclosed in the JP Publication No. 61-17103 is a polarizing beam splitter provided with a relief-type diffraction grating having formed thereon a polarization dependent reflective layer. This polarizer employs a diffraction grating which allows a particular wavelength component of incident light to be diffracted and will hardly be suited for use as a general-purpose polarizer.

The polarizer disclosed in the JP Publication No. 61-262705 incorporates a multi-layer dielectric material serving as both a polarizing filter and a phase differential plate and provided on a triangle-waveform surface of a transparent material which is formed by arranging inverted-V shape crests and V-shaped recesses alternately. In other words, the triangle-waveform surface of a transparent resin layer provided on a substrate is coated with a multi-layer film of dielectric material. However, the forming of the multi-layer dielectric film on the resin layer is difficult, and the use of a resin material will lower the resistance to climate. Also, both the peak and bottom points of the triangle-waveform cause reduction in the performance of the polarizer. Further, the wavelength selection capability is insufficient.

As described above, the conventional polarizers are disadvantageous in the production cost of a relating device, the use of reflected light, the reduction of overall size, and the resistance to climate and also, are insufficient in such optical properties as the extinction ratio and the wavelength selection.

SUMMARY OF THE INVENTION

It is an object of the present invention to provide an improved polarizer which is low in the production cost, high in the resistance to climate, and capable of utilizing a reflected light, reducing the overall size or thickness, and selecting a desired wavelength for propagation.

For achievement of the aforementioned object, a polarizer according to the present invention incorporates an optical element having a polarized-light separation function which extends over an undulated surface of a substrate having a cross section of either trapezoid-waveform or triangle-waveform pattern formed continuously in a particular direction. The substrate having the trapezoid-waveform surface incorporates an optical element having a light reflection or absorption function which is provided on each of the upper and lower flat portions each corresponding to a base of a trapezoid. On the other hand, the substrate having the triangle-waveform surface incorporates an optical element having a light absorption function which is provided on each of the upper and lower peaks of the surface. The polarizer may have also a second substrate bonded to the first substrate by a bonding layer while allowing a thin film to be interposed between the two substrates. Furthermore, an optical element having a wavelength selection function may be provided over the surface of the substrate opposite to the trapezoid-waveform or triangle-waveform surface.

Accordingly, the improved polarizer of the present invention will exhibit the following advantages:

1. The optical element having the polarized-light separation function formed on the slope part of the substrate surface passes a linearly polarized component of incoming light polarized in a particular direction, and reflects another linearly polarized component polarized in a perpendicular direction to the particular direction. The reflected component is then reflected again on the adjacent surface to the previous surface to run in the reverse direction to the incoming light because the surface of the substrate is arranged in the trapezoid-waveform or triangle-waveform and thus, will be spared for appropriate use.

2. The polarizer can be reduced in the overall thickness by reducing the size of the trapezoid-waveform or triangle-waveform of the substrate surface into a smaller size.

3. The optical element formed on the part corresponding to bases of the trapezoid-waveform for reflection or absorption of light will ensure the polarizer a higher extinction ratio.

4. The optical element formed on the peaks of the triangle-waveform for absorption of light will also ensure the polarizer a higher extinction ratio.

5. The surface opposite to the trapezoid-waveform or triangle-waveform surface of the substrate is coated with the optical element for wavelength selection and will permit the polarizer to be improved in the wavelength selection.

6. When the substrate is formed of glass material through press forming, the mass production of the polarizers will be less costly.

BRIEF DESCRIPTION OF THE DRAWINGS

FIGS. 3 and 4 are graphic diagrams each showing a spectral transmittance characteristic of a polarizer according to the present invention; and FIG. 5 is a graphic diagram showing a spectral transmittance characteristic of an optical element provided in the polarizer for wavelength selection.

PREFERRED EMBODIMENTS OF THE INVENTION

Figure 1A:
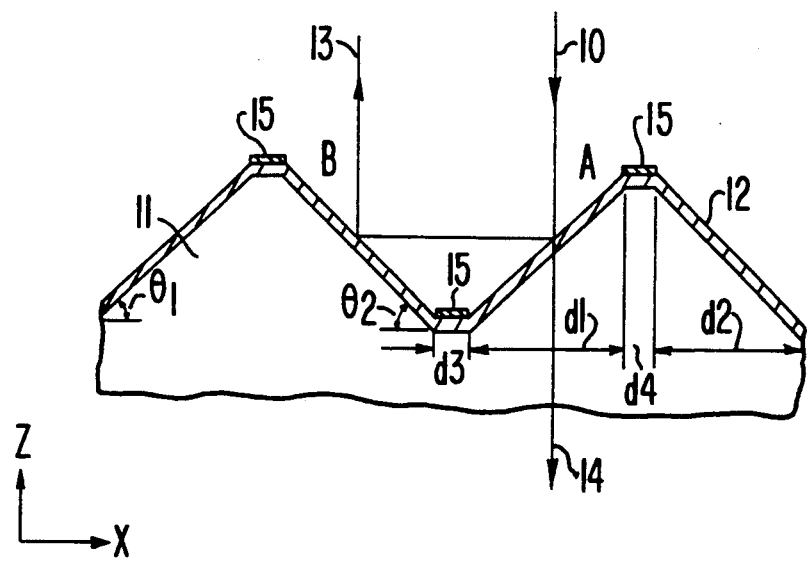
FIGS. 1(A) and (B) are structural views of polarizers (in cross section) showing preferred embodiments of the present invention.

FIGS. 1(A) and (B) are structural views (in cross section) showing polarizers according to the present invention. FIG. 2 is a structural view of a polarizer of another embodiment. As shown in FIGS. 1(A) and (B), a substrate represented by the numeral 11 is provided having an undulated surface formed into either trapezoid waveform, shown in FIG. 1(A), or triangle-waveform, shown in FIG. 1(B), in cross section which extends in the direction of x. Represented by 12 is an optical element provided on the surface, including the sloping regions of the trapezoid-waveform or triangle-waveform, of the substrate 11 for polarizing separation of light. There are also provided layers of optical element 15 for reflection or absorption of light, which rest on the upper- and lower-base regions of the trapezoid-waveform. On the other hand, layers of optical element 16 for absorption of light are provided on the peak regions of the triangle-waveform.

Optical element layers for reflection or absorption of light may be arranged on the opposite planar surface of the substrate at portions aligned with the upper- and lower-base regions of the trapezoid-waveform or the peak regions of the triangle-waveform.

A linearly polarized component 14 parallel to the incident plane of incoming light 10 incident on the sloping surface A of the trapezoid-waveform or triangle-waveform surface at an incident angle of 45° passes through the surface. A linearly polarized component 13 perpendicular to the incident plane is reflected on the slope surface A coated with the optical element 12 having the polarized-light separation function and then incident on the slope surface B adjacent to the slope surface A. The slopes A and B have the same incident plane. Thus, the component light 13 incident on the slope B is once again reflected by the optical element 12 provided on the slope B and returns back in the reverse direction to that of the incoming light 10. Light incident on the other slopes will run in the same manner. The light incident on the surface of the trapezoid-waveform, except the slopes, is either reflected or absorbed by the optical element layers having light reflecting or absorbing function. Accordingly, a linearly polarized component of the light entering the polarizer, which vibrates in a particular plane, will be transmitted. The light incident on the peak regions of the triangle-waveform surface is not affected by the action of polarizing separation and the regions are thus coated with different optical element for absorption of light. The polarizer of this type may also have a coating of specific optical element provided for wavelength selection over the opposite surface of the substrate, opposite to the trapezoid-waveform or triangle-waveform surface, so as to ensure enhancement in the wavelength selection.

The optical element having the polarized-light separation function or the wavelength selection function is provided in the form of a thin film of dielectric or semiconductive material. The dielectric materials for forming the thin film may be selected from $Al_2O_3$, $CaF_2$, $CeO_2$, $HfO_2$, $MgF_2$, $SiO_2$, $TiO_2$, and $ZrO_2$. The semiconductive material is preferably Si or Ge.

The material for the reflective layers may be selected from Ni, Cr, Ti, Ag, Au, Cu, and an alloy of these.

Both the dielectric thin film and the metallic reflective layer can be formed by a procedure of vacuum deposition or sputtering.

The optical element having the light absorption function is preferably a type of paint containing black pigment and may be applied by spraying.

Also, two substrates having the same structure as above may be bonded with a bonding layer so that the optical element having the polarized-light separation function is sandwiched between the two substrates. Preferably, the bonding layer is approximately equal in the refractive index to the substrates of the polarizer and may be made of a thermoset resin or an ultraviolet curing resin.

The substrate needs to have a surface thereof formed of either trapezoid-waveform or triangle-waveform in cross section and may be shaped by a known method of milling. Since it is quite troublesome to have the sloping regions of the trapezoid-waveform or triangle-waveform surface mirror finished, the surface of the substrate can be arranged into the shape by press-molding a piece of glass and transferring an undulation of a mold surface to the glass surface.

EXAMPLE 1

Figure 3:
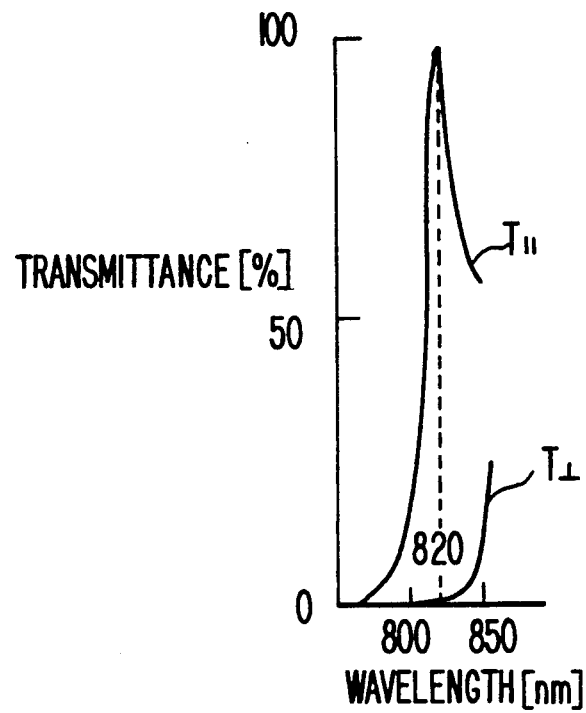

In the arrangement of the polarizer associated with Example 1, the surface of the substrate 11 has an arrangement of trapezoid-waveform in cross section which extends in the direction of x as shown in FIG. 1(A) and is coated with the optical element 12 for polarizing separation of light. The optical element 12 was provided in the form of a 19-layer thin film comprising titanium dioxide ($TiO_2$) and silicon dioxide ($SiO_2$) dielectric layers laminated alternately, which are described in Table 1. The substrate 11 was produced by press-molding of optical glass having a refractive index of 1.52. Each of the dielectric layers was formed by a procedure of vacuum deposition. The optical element 15 which is a type of paint containing black pigment was also provided in the form of layers extending over the trapezoid-waveform surface, except the sloping regions, for absorption of light. The shape of each trapezoid shown in FIG. 1(A) was determined in which $\theta_1=\theta_2=45°$, $d_1=d_2=80$ μm, and $d_3=d_4=5$ μm. FIG. 3 shows a spectral transmittance characteristic of the polarizer of Example 1, in which T ∥ and T⊥ are linearly polarized components of light perpendicular to each other: T ∥ is a linearly polarized component light vibrating parallel to an incident plane; and T⊥ is a linearly polarized component light vibrating perpendicular to the incident plane.

TABLE 1

| | OPTICAL THICKNESS | MATERIAL | REFRACTIVE INDEX |
|---|---|---|---|
| INCIDENT MEDIUM | | AIR | 1.00 |
| 19th LAYER | $\lambda_0/4$ | $TiO_2$ | 2.30 |
| 18th LAYER | $\lambda_0/4$ | $SiO_2$ | 1.46 |
| 17th LAYER | $\lambda_0/4$ | $TiO_2$ | 2.30 |
| 16th LAYER | $\lambda_0/4$ | $SiO_2$ | 1.46 |
| 15th LAYER | $\lambda_0/4$ | $TiO_2$ | 2.30 |
| 14th LAYER | $\lambda_0/4$ | $SiO_2$ | 1.46 |
| 13th LAYER | $\lambda_0/4$ | $TiO_2$ | 2.30 |
| 12th LAYER | $\lambda_0/4$ | $SiO_2$ | 1.46 |
| 11th LAYER | $\lambda_0/4$ | $TiO_2$ | 2.30 |
| 10th LAYER | $\lambda_0/4$ | $SiO_2$ | 1.46 |
| 9th LAYER | $\lambda_0/4$ | $TiO_2$ | 2.30 |
| 8th LAYER | $\lambda_0/4$ | $SiO_2$ | 1.46 |
| 7th LAYER | $\lambda_0/4$ | $TiO_2$ | 2.30 |
| 6th LAYER | $\lambda_0/4$ | $SiO_2$ | 1.46 |
| 5th LAYER | $\lambda_0/4$ | $TiO_2$ | 2.30 |
| 4th LAYER | $\lambda_0/4$ | $SiO_2$ | 1.46 |
| 3rd LAYER | $\lambda_0/4$ | $TiO_2$ | 2.30 |
| 2nd LAYER | $\lambda_0/4$ | $SiO_2$ | 1.46 |
| 1st LAYER | $\lambda_0/4$ | $TiO_2$ | 2.30 |
| SUBSTRATE | | GLASS | 1.52 |

($\lambda_0$ = 760 nm)

The optical thickness is a product of the thickness and the refractive index of a layer and $\lambda_o$ is a reference wavelength in the optical thickness.

As apparent from the diagram of FIG. 3, the extinction ratio is 1/200 when the design wavelength $\lambda_c$ is 820 nm. The extinction ratio is obtained from $T\perp/(T\parallel + T\perp)$.

EXAMPLE 2

Figure 1B:
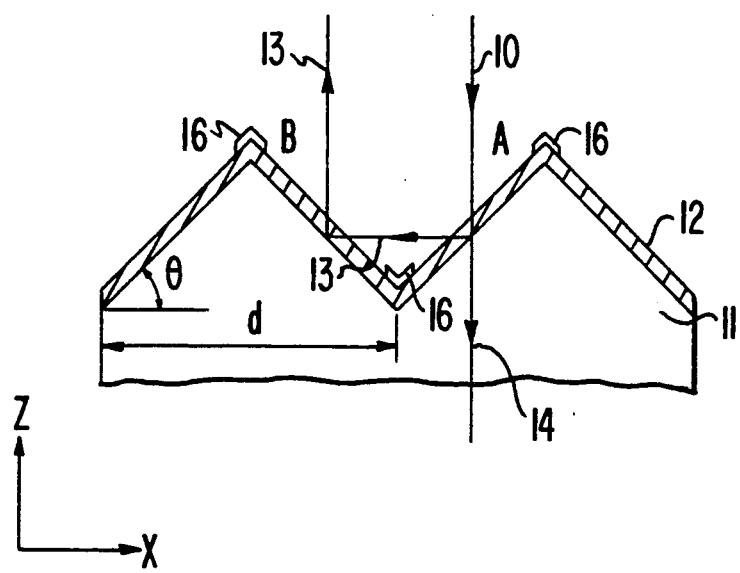
Figure 2:
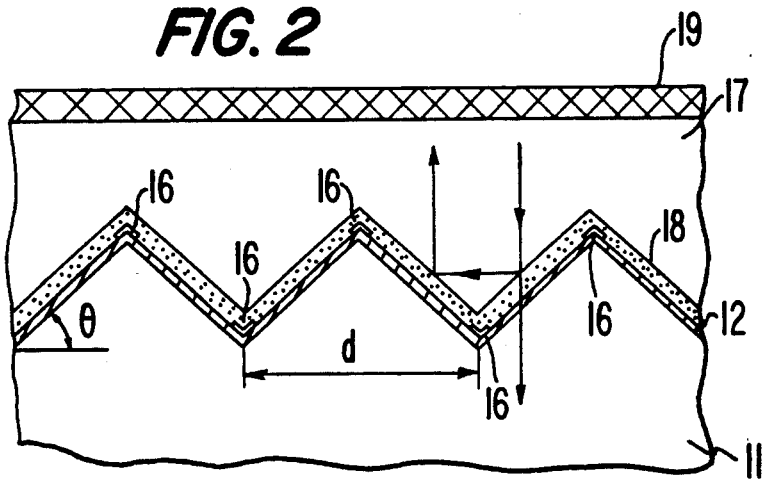
FIG. 2 is a structural view of a polarizer of another embodiment.

In the arrangement of a polarizer associated with Example 2, the surface of the substrate 11 has an arrangement of triangle-waveform in cross section which extends in the direction of x as shown in FIG. 1(B) and is coated with the optical element 12 for polarizing separation of light. The optical element 12 was provided in the form of a 21-layer thin film comprising lead fluoride ($PbF_2$) and magnesium fluoride ($MgF_2$) dielectric layers stacked alternately, which are described in Table 2. The substrate 11 was produced by press-molding of optical glass having a refractive index of 1.52. Each of the dielectric layers was formed by the procedure of vacuum deposition. The optical element 16 which is a type of paint containing black pigment was also provided for absorption of light in the form of layers arranged to cover the minimum regions, including the upper and lower peaks, of the triangle-waveform surface. The triangle-waveform shown in FIG. 1(B) was arranged in which $\theta=45°$ and d=1.0 mm. FIG. 2 illustrates the substrate 11 of FIG. 1(B) bonded to a second substrate 17 which has also a triangle-waveform surface corresponding to that of the substrate 11. 18 is a bonding layer between the first and second substrates. The refractive index of the layer 18 is approximately equal to that of the substrates.

FIG. 4 shows a spectral transmittance characteristic of the polarizer of Example 2, in which T ∥ and $T_{195}$ are linearly polarized components of light perpendicular to each other: T ∥ is a linearly polarized component light vibrating parallel to an incident plane; and T⊥ is a linearly polarized component light vibrating perpendicular to the incident plane.

TABLE 2

| | OPTICAL THICKNESS | MATERIAL | REFRACTIVE INDEX |
|---|---|---|---|
| INCIDENT MEDIUM | | GLASS* | 1.52 |
| 21st LAYER | $\lambda_0/8$ | $MgF_2$ | 1.38 |
| 20th LAYER | $\lambda_0/4$ | $PbF_2$ | 1.71 |
| 19th LAYER | $\lambda_0/4$ | $MgF_2$ | 1.38 |
| 18th LAYER | $\lambda_0/4$ | $PbF_2$ | 1.71 |
| 17th LAYER | $\lambda_0/4$ | $MgF_2$ | 1.38 |
| 16th LAYER | $\lambda_0/4$ | $PbF_2$ | 1.71 |
| 15th LAYER | $\lambda_0/4$ | $MgF_2$ | 1.38 |
| 14th LAYER | $\lambda_0/4$ | $PbF_2$ | 1.71 |
| 13th LAYER | $\lambda_0/4$ | $MgF_2$ | 1.38 |
| 12th LAYER | $\lambda_0/4$ | $PbF_2$ | 1.71 |
| 11th LAYER | $\lambda_0/4$ | $MgF_2$ | 1.38 |
| 10th LAYER | $\lambda_0/4$ | $PbF_2$ | 1.71 |
| 9th LAYER | $\lambda_0/4$ | $MgF_2$ | 1.38 |
| 8th LAYER | $\lambda_0/4$ | $PbF_2$ | 1.71 |
| 7th LAYER | $\lambda_0/4$ | $MgF_2$ | 1.38 |
| 6th LAYER | $\lambda_0/4$ | $PbF_2$ | 1.71 |
| 5th LAYER | $\lambda_0/4$ | $MgF_2$ | 1.38 |
| 4th LAYER | $\lambda_0/4$ | $PbF_2$ | 1.71 |
| 3rd LAYER | $\lambda_0/4$ | $MgF_2$ | 1.38 |
| 2nd LAYER | $\lambda_0/4$ | $PbF_2$ | 1.71 |
| 1st LAYER | $\lambda_0/4$ | $MgF_2$ | 1.38 |
| SUBSTRATE | | GLASS | 1.52 |

($\lambda_0$ = 1060 nm)
*Including the bonding layer.

The optical thickness is a product of the thickness and the refractive index of a layer and $\lambda_o$ is a reference wavelength in the optical thickness.

As apparent from the graph of FIG. 4, the extinction ratio is less than 1/1000 when the wavelength $\lambda_c$ is 710 to 780 nm; 750 nm in average. The extinction ratio is obtained from $T\perp/(T\parallel + T\perp)$.

Although the second substrate in Example 2 is similar in shape to the first substrate, they may be arranged in planar shape having no undulated surface, with equal success, while the thickness of the bonding layer is increased.

Also, the outer surface of the secondary substrate 17 was coated with an optical element 19 for wavelength selection. The optical element 19 was provided in the form of a 25-layer thin film comprising $TiO_2$, $SiO_2$, and $Al_2O_3$ dielectric layers, as described in Table 3, and formed by a vacuum deposition method. The characteristic curve of the optical element 19 is illustrated in FIG. 5.

TABLE 3

| | OPTICAL THICKNESS | MATERIAL | REFRACTIVE INDEX |
|---|---|---|---|
| INCIDENT MEDIUM | | AIR | 1.00 |
| 25th LAYER | $\lambda_1/2$ | $SiO_2$ | 1.46 |
| 24th LAYER | $\lambda_1/4$ | $TiO_2$ | 2.30 |
| 23rd LAYER | $\lambda_1/4$ | $SiO_2$ | 1.46 |
| 22nd LAYER | $\lambda_1/4$ | $TiO_2$ | 2.30 |
| 21st LAYER | $\lambda_1/4$ | $SiO_2$ | 1.46 |
| 20th LAYER | $\lambda_1/4$ | $TiO_2$ | 2.30 |
| 19th LAYER | $\lambda_1/4$ | $SiO_2$ | 1.46 |
| 18th LAYER | $\lambda_1/4$ | $TiO_2$ | 2.30 |
| 17th LAYER | $\lambda_1/4$ | $SiO_2$ | 1.46 |
| 16th LAYER | $\lambda_1/4$ | $TiO_2$ | 2.30 |
| 15th LAYER | $\lambda_1/4$ | $SiO_2$ | 1.46 |
| 14th LAYER | $\lambda_1/4$ | $TiO_2$ | 2.30 |
| 13th LAYER | $\lambda_1/4$ | $Al_2O_3$ | 1.63 |
| 12th LAYER | $\lambda_2/4$ | $TiO_2$ | 2.30 |

TABLE 3-continued

| | OPTICAL THICKNESS | MATERIAL | REFRACTIVE INDEX |
|---|---|---|---|
| 11th LAYER | $\lambda_2/4$ | $SiO_2$ | 1.46 |
| 10th LAYER | $\lambda_2/4$ | $TiO_2$ | 2.30 |
| 9th LAYER | $\lambda_2/4$ | $SiO_2$ | 1.46 |
| 8th LAYER | $\lambda_2/4$ | $TiO_2$ | 2.30 |
| 7th LAYER | $\lambda_2/4$ | $SiO_2$ | 1.46 |
| 6th LAYER | $\lambda_2/4$ | $TiO_2$ | 2.30 |
| 5th LAYER | $\lambda_2/4$ | $SiO_2$ | 1.46 |
| 4th LAYER | $\lambda_2/4$ | $TiO_2$ | 2.30 |
| 3rd LAYER | $\lambda_2/4$ | $SiO_2$ | 1.46 |
| 2nd LAYER | $\lambda_2/4$ | $TiO_2$ | 2.30 |
| 1st LAYER | $\lambda_2/2$ | $Al_2O_3$ | 1.63 |
| SUBSTRATE | | GLASS | 1.52 |

($\lambda_1$ = 580 nm)
($\lambda_2$ = 928 nm)

The optical thickness is a product of the thickness and the refractive index of a layer and $\lambda_1$ and $\lambda_2$ are reference wavelengths in the optical thickness.

The characteristic of the polarizer having the optical element for wavelength selection is expressed by a combination of the curves in FIGS. 4 and 5, in which the wavelength selection is highly improved.

The optical elements for polarized-light separation, light reflection, and light absorption are not limited to those employed in the Examples and may be used of various arrangements suited for the application.

What is claimed is:

1. A polarizer comprising:
   a substrate which has a continuously undulated surface of trapezoid-waveform in cross section;
   a layer of an optical element having a polarized-light separating function formed on each of sloping regions of the trapezoid-waveform surface; and
   a layer of an optical element having a light reflecting or light absorbing function formed on each of the remaining regions excluding the sloping regions of said surface.

2. A polarizer according to claim 1, further comprising a second substrate bonded to said substrate with an optical element layer interposed between the two substrates.

3. A polarizer according to claim 2, wherein the second substrate has the same undulated surface of trapezoid-waveform in cross section as that of said substrate.

4. A polarizer according to claim 1, a surface of the substrate opposite to the undulated surface of trapezoid-waveform in cross section is in planar shape and covered with a layer of an optical element having a light waveform selection function.

5. A polarizer according to claim 4, wherein the layer of the optical element having a light wavelength selection function is a multilayer thin film of dielectric, semiconductive, or metallic material.

6. A polarizer according to claim 1, wherein the layer of the optical element having a polarized-light separating function is a multilayer thin film of dielectric and semiconductive layers.

7. A polarizer according to claim 1, wherein the layer of the optical element having a light reflecting function is a metallic layer.

8. A polarizer according to claim 1, wherein the layer of the optical element having a light absorbing function is a layer of paint containing pigment.

9. A polarizer according to claim 1, wherein the substrate is formed by press-molding a piece of glass.

10. A polarizer comprising:
    a substrate which has a continuously undulated surface of triangle-waveform in cross section;
    a layer of an optical element having a polarized-light separating function formed on each of sloping regions of the triangle-waveform surface;
    a layer of an optical element having a light absorbing function formed on each of upper and lower peaks of the triangle-waveform surface; and
    a layer of an optical element having a light waveform selecting function formed on a planar surface of the substrate opposite to the triangle-waveform surface.

11. A polarizer according to claim 10, further comprising a second substrate bonded to said substrate with an optical element layer interposed between the two substrates.

12. A polarizer according to claim 11, wherein the second substrate has the same undulated surface of triangle-waveform in cross section as that of said substrate.

13. A polarizer according to claim 10, wherein the layer of the optical element having a polarized-light separating function is a multilayer thin film of dielectric and semiconductive layers.

14. A polarizer according to claim 10, wherein the layer of the optical element having a light absorbing function is a layer of paint containing pigment.

15. A polarizer according to claim 10, wherein the layer of the optical element having a light wavelength selecting function is a multilayer thin film of dielectric, semiconductive, or metallic material.

16. A polarizer according to claim 10, wherein the substrate is formed by press-molding a piece of glass.

* * * * *